F. S. CLARKSON.
Caster.

No. 223,838. Patented Jan. 27, 1880.

Witnesses,
W. A. Bertram
D. L. H. Barclay

Inventor,
FRANK S. CLARKSON
by
A. D. Williams
Attorney.

UNITED STATES PATENT OFFICE.

FRANK S. CLARKSON, OF BALTIMORE, MARYLAND.

CASTER.

SPECIFICATION forming part of Letters Patent No. 223,838, dated January 27, 1880.

Application filed November 18, 1879.

*To all whom it may concern:*

Be it known that I, FRANK S. CLARKSON, of Baltimore city, State of Maryland, have invented certain new and useful Improvements in Casters; and I hereby declare the same to be fully, clearly, and exactly described as follows, reference being had to the accompanying drawings, in which—

Figure 1:
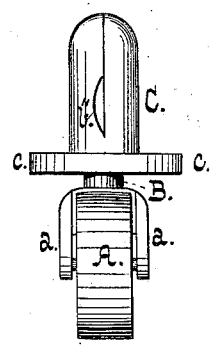
Figure 2:
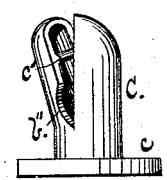
Figure 3:
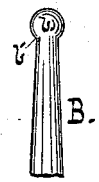

Figure 1 is a front-elevation of the caster; Fig. 2, a detached view of the sleeve ready for the insertion of the center-pin, and Fig. 3 is a side elevation of the latter.

My invention relates to ordinary furniture-casters of that general class in which the center-pin revolves freely within a sleeve or socket; and it has for its object to provide a caster whose center-pin is securely retained within a socket which is split at the top to admit of the insertion of the headed pin, and subsequently compressed to retain it in place.

In casters of the class to which my own belongs the head of the pin is retained by means of a stricture or collar on the inside of the sleeve or socket, which heretofore precluded the insertion of the pin into a socket formed of a single piece, as the head of the pin would, of course, not pass the collar. In a caster of this class, long and favorably known as the "Miller" caster, the socket is formed in halves, each having a ridge on the inside to secure the pin; but the device is open to the objection that, consisting, as it does, of three separate parts, the loss of one practically destroys the caster.

My caster consists of but two separate parts—the sleeve and pin, with its roller—which parts are formed separately, and when completed are secured together, to be sent into commerce, in such manner that they cannot become separated.

In the accompanying drawings, A is the roller, pivoted, as usual, in a yoke, $a$, formed integral with the center-pin B, which is provided with a head, $b$, and neck $b'$.

The pin and yoke are, by preference, formed cheaply of malleable cast-iron, which may be bronzed.

The sleeve or socket C is a malleable casting formed in one piece, and having a flange, $c$, as usual. It is split at the upper end, as shown, and is opened wide enough to admit of the passage of the head $b$ past the collar $c'$. The parts are, as stated, formed separately, and are permanently joined by inserting the pin in the socket and compressing the open end of the latter until the parts come together, whereby the collar on the inside of the sleeve enters the neck of the pin and securely retains it.

I have considered it unnecessary to illustrate such usual and well-known features as ridges or threads on the exterior of the sleeve to retain it in place in the article of furniture under which the caster is used. They form no part of my invention, and may be of any well-known form.

Instead of having the pin-head $b$ on the interior of the sleeve, it may be exterior without departing from the spirit of my invention, which consists, essentially, in so forming the sleeve as to admit of the insertion of the pin, and subsequently compressing the sleeve upon the pin to retain it.

The device may be formed throughout of cast metal. Its parts are permanently held together, while formed separately. It is simple and thoroughly efficient in use.

While I have illustrated the device in Fig. 2 as having one of its sides only bent away from the other, it is obvious that both may be bent. Either or both are cut away somewhat, as shown at $b''$, to facilitate the bending, which would otherwise, owing to the semi-cylindrical form of the part, be attended with some difficulty.

What I claim is—

1. A caster having a headed center-pin and a socket or sleeve split at its upper end and provided with an internal collar, which engages with the neck of the pin when the socket is closed upon it, substantially as set forth.

2. A caster having its socket or sleeve split, as described, to admit of the insertion of the headed pin, and cut away, as shown, to admit of and facilitate the closure of the sleeve after the insertion of the pin, substantially as described.

FRANK S. CLARKSON.

Witnesses:
R. D. WILLIAMS,
JOHN C. GITTINGER.